(12) United States Patent
Jose et al.

(10) Patent No.: US 10,691,450 B2
(45) Date of Patent: Jun. 23, 2020

(54) SYSTEM AND METHOD FOR MANAGING END TO END AGILE DELIVERY IN SELF OPTIMIZED INTEGRATED PLATFORM

(71) Applicant: Tata Consultancy Services Limited, Mumbai (IN)

(72) Inventors: Alin Jose, Chennai (IN); Prabhu Arumugham, Chennai (IN); Anupama Kasturi, Chennai (IN); Smitha Pereira, Chennai (IN); Aruna Balasubramanian, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 58 days.

(21) Appl. No.: 15/938,553

(22) Filed: Mar. 28, 2018

(65) Prior Publication Data

US 2019/0243644 A1   Aug. 8, 2019

(30) Foreign Application Priority Data

Feb. 2, 2018   (IN) .............................. 201821004097

(51) Int. Cl.
*G06F 9/44* (2018.01)
*G06F 8/77* (2018.01)
(Continued)

(52) U.S. Cl.
CPC ................. *G06F 8/77* (2013.01); *G06F 8/60* (2013.01); *G06N 20/00* (2019.01); *G06Q 10/06311* (2013.01); *G06Q 10/06313* (2013.01)

(58) Field of Classification Search
CPC ....................................................... G06F 8/77
(Continued)

(56) References Cited

U.S. PATENT DOCUMENTS 8,095,413 B1 * 1/2012 Beaven .............. G06Q 10/0637
705/7.38
8,214,240 B1 * 7/2012 Morris ................... G06Q 10/06
705/7.11
(Continued)

OTHER PUBLICATIONS

Kevin Vlaanderen et al., "The agile requirements refinery: Applying SCRUM principles to software product management", Aug 2010, pp. 58-70 (Year: 2010).*

(Continued)

*Primary Examiner* — Wei Y Zhen
*Assistant Examiner* — Lanny N Ung
(74) *Attorney, Agent, or Firm* — Finnegan, Henderson, Farabow, Garrett & Dunner LLP

(57) ABSTRACT

In an agile delivery program, hundreds of team members are organised into multiple agile teams work in a synchronized manner, to build a product. Normally, they are geographically distributed teams need to have the infrastructure and tools, to manage their agile delivery seamlessly. In addition to team, a product backlog, and sprint duration also need to be managed the simultaneously. A system and method for managing a program in an agile delivery environment using a single integrated platform has been described. The method involves providing a set of visions to each of the members working in the program. The set of goals, the teams and sprint duration are then provided. The profiling and machine learning techniques are then performed on these parameters to generate an optimal release plan for the release of the product.

16 Claims, 9 Drawing Sheets

(51) Int. Cl.
    *G06Q 10/06*     (2012.01)
    *G06N 20/00*     (2019.01)
    *G06F 8/60*     (2018.01)

(58) Field of Classification Search
    USPC .................................................. 717/101, 102
    See application file for complete search history.

(56) References Cited

U.S. PATENT DOCUMENTS

| | | | |
|---|---|---|---|
| 8,433,550 B2* | 4/2013 | Rheaume | G06F 17/5095 |
| | | | 703/8 |
| 8,739,113 B2* | 5/2014 | Packbier | G06F 9/44 |
| | | | 717/103 |
| 8,819,617 B1* | 8/2014 | Koenig | G06F 8/70 |
| | | | 717/101 |
| 9,082,316 B2* | 7/2015 | Baur | G06Q 10/06398 |
| 9,690,461 B2* | 6/2017 | Holler | G06F 3/04842 |
| 2004/0215706 A1* | 10/2004 | Lavender | G06F 8/65 |
| | | | 709/201 |
| 2007/0168918 A1* | 7/2007 | Metherall | G06Q 10/06 |
| | | | 717/101 |
| 2014/0380300 A1* | 12/2014 | Sampson | G06F 8/656 |
| | | | 717/174 |
| 2015/0220325 A1 | 8/2015 | Poon et al. | |
| 2016/0364210 A1* | 12/2016 | Davidov | G06F 8/20 |
| 2018/0060785 A1* | 3/2018 | Carnevale | G06Q 10/063112 |

OTHER PUBLICATIONS

Rashmi Popli et al., "Cost and EFfort Estimation in Agile Software Development", Feb. 2014, pp. 57-61 (Year: 2014).*

\* cited by examiner

SYSTEM AND METHOD FOR MANAGING END TO END AGILE DELIVERY IN SELF OPTIMIZED INTEGRATED PLATFORM

PRIORITY CLAIM

This U.S. patent application claims priority under 35 U.S.C. § 119 to: India Application No. 201821004097, filed on Feb. 2, 2018. The entire contents of the aforementioned application are incorporated herein by reference.

TECHNICAL FIELD

The embodiments herein generally relates to the field of a project management in an agile delivery environment, and, more particularly, to a method and system for managing and planning end to end agile delivery of the product in a program in a self-optimized integrated platform along with scaled agile at an enterprise level.

BACKGROUND

In today's era, enterprises are leveraging digital technologies to deliver services and provide greater value to customers. Going digital enables them to expand quickly across newer markets with the help of innovative business models. The advent of new technologies has changed the power equation between businesses and consumers. Greater power now lies in the hands of customers who dictate when, where and how they would like to engage with businesses. With this it has become extremely important to deliver solutions with quality and speed. This can be possible only by adopting agile practices across the enterprise.

Agile practices enable enterprises to deliver solutions faster with better quality by shortening the feedback loop. Though enterprises have realized the significance of agile, large organizations have been struggling to scale agile at the enterprise level. But smaller and nimbler companies have adopted the agile way of working and have achieved considerable success in the market.

The use of agile delivery environment for project management has becoming popular. Though most organizations are embracing agile, the need of the hour is enterprise agile management products for better collaboration and coordination among all cross-functional teams, addressing dependencies and impediments. Agile software development refers to software development methodologies in which software is developed incrementally in steps referred to as iterations or sprints. Enterprise wide agile adoption is not only about technology, but a new way of thinking which is more collaborative, innovative and efficient than other business models.

One of the most prominent issues involved in agile software development is to decide upon the software release plans while taking into account diverse qualitative and quantitative project data. This is called as release planning. The input for the release planning process is a set of features that are evolving due to changing user requirements and better problem understanding. In addition to that there are various other factors that would make up the release based on the features that business is expecting. The existing agile delivery management systems do not provided a tool or feature which can intuitively plan a release considering the various parameters such as scope, timelines, available resources etc. There is a certain need for robust agile development management tool.

SUMMARY

Embodiments of the present disclosure present technological improvements as solutions to one or more of the above-mentioned technical problems recognized by the inventors in conventional systems. For example, in one embodiment, a system for managing a program in an agile delivery environment is provided. The system comprises an input module, a vision board, a memory and a processor. The input module provides a set of visions corresponding to the program, a list of a plurality of teams participating in the release of the program, wherein each of the plurality of teams has a team velocity, and a sprint duration to be used during the release of the program. The vision board displays the set of visions. The processor in communication with the memory, the processor further configured to perform the steps of: deriving a set of goals aligned to the set of visions, wherein each of the set of goals have a key result metric; deriving a set of requirements from a plurality of sources to achieve the set of goals, wherein the set of requirements is maintained in a product backlog based on the priority; performing profiling of the plurality of teams, the product backlog and the sprint duration using a profiling module; performing a set of machine learning methods based on the profiling for generating a set of recommendations for matching the plurality of teams with the set of requirements for optimal release of the program using a machine learning module; delivering a minimum viable product corresponding to the program based on the set of recommendations at the end of every sprint using an MVP delivering module; and managing the release of the program through an automated deployment pipeline by defining the various stages that the program would go through in a single click start using a product build release management module.

In another aspect the embodiment here provides a method for managing a program in an agile delivery environment. Initially, a set of visions are provided corresponding to the program. In the next step, a set of goals are derived, which are aligned to the set of visions, wherein each of the set of goals have a key result metric. In the next step, a set of requirements are derived from a plurality of sources to achieve the set of goals, wherein the set of requirements is maintained in a product backlog based on the priority. A sprint duration to be used during the release of the program is then decided. In the next step, a list of a plurality of teams participating in the release of the program is provided, wherein each of the plurality of teams has a team velocity. In the next step, profiling of the plurality of teams is performed, the product backlog and the sprint duration. In the next step, a set of machine learning methods is performed based on the profiling for generating a set of recommendations for matching the plurality of teams with the set of requirements for optimal release of the program. In the next step, a minimum viable product is delivered corresponding to the program based on the set of recommendations at the end of every sprint. And finally, the release of the program is manage through an automated deployment pipeline by defining the various stages that the program would go through in a single click start.

In another embodiment, a non-transitory computer-readable medium having embodied thereon a computer program for managing a program in an agile delivery environment. Initially, a set of visions are provided corresponding to the program. In the next step, a set of goals are derived, which are aligned to the set of visions, wherein each of the set of goals have a key result metric. In the next step, a set of requirements are derived from a plurality of sources to achieve the set of goals, wherein the set of requirements is maintained in a product backlog based on the priority. A sprint duration to be used during the release of the program is then decided. In the next step, a list of a plurality of teams participating in the release of the program is provided, wherein each of the plurality of teams has a team velocity. In the next step, profiling of the plurality of teams is performed, the product backlog and the sprint duration. In the next step, a set of machine learning methods is performed based on the profiling for generating a set of recommendations for matching the plurality of teams with the set of requirements for optimal release of the program. In the next step, a minimum viable product is delivered corresponding to the program based on the set of recommendations at the end of every sprint. And finally, the release of the program is manage through an automated deployment pipeline by defining the various stages that the program would go through in a single click start.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
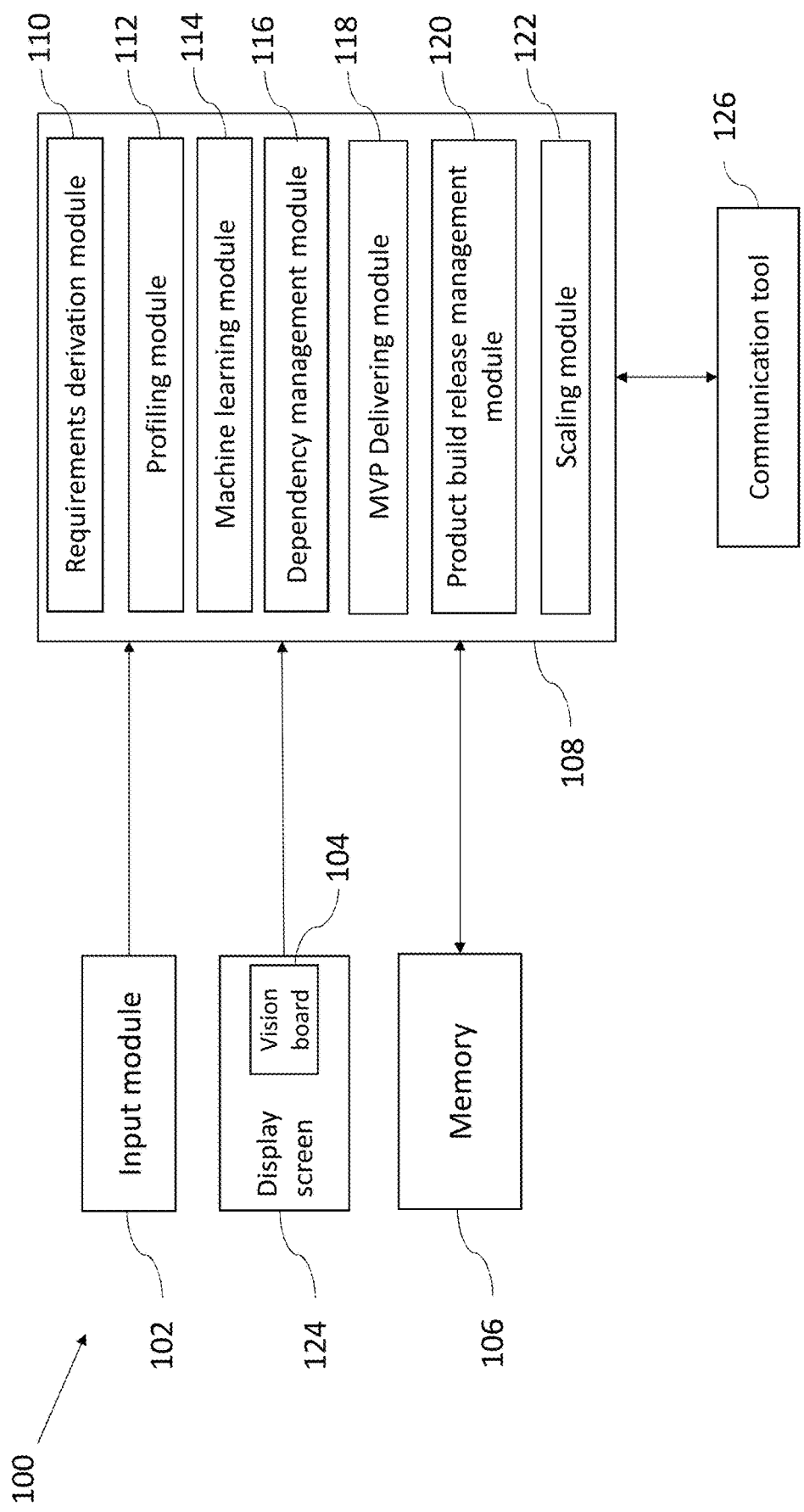
FIG. 1 illustrates a block diagram of a system for managing a program in an agile delivery environment according to an embodiment of the present disclosure.
Figure 2:
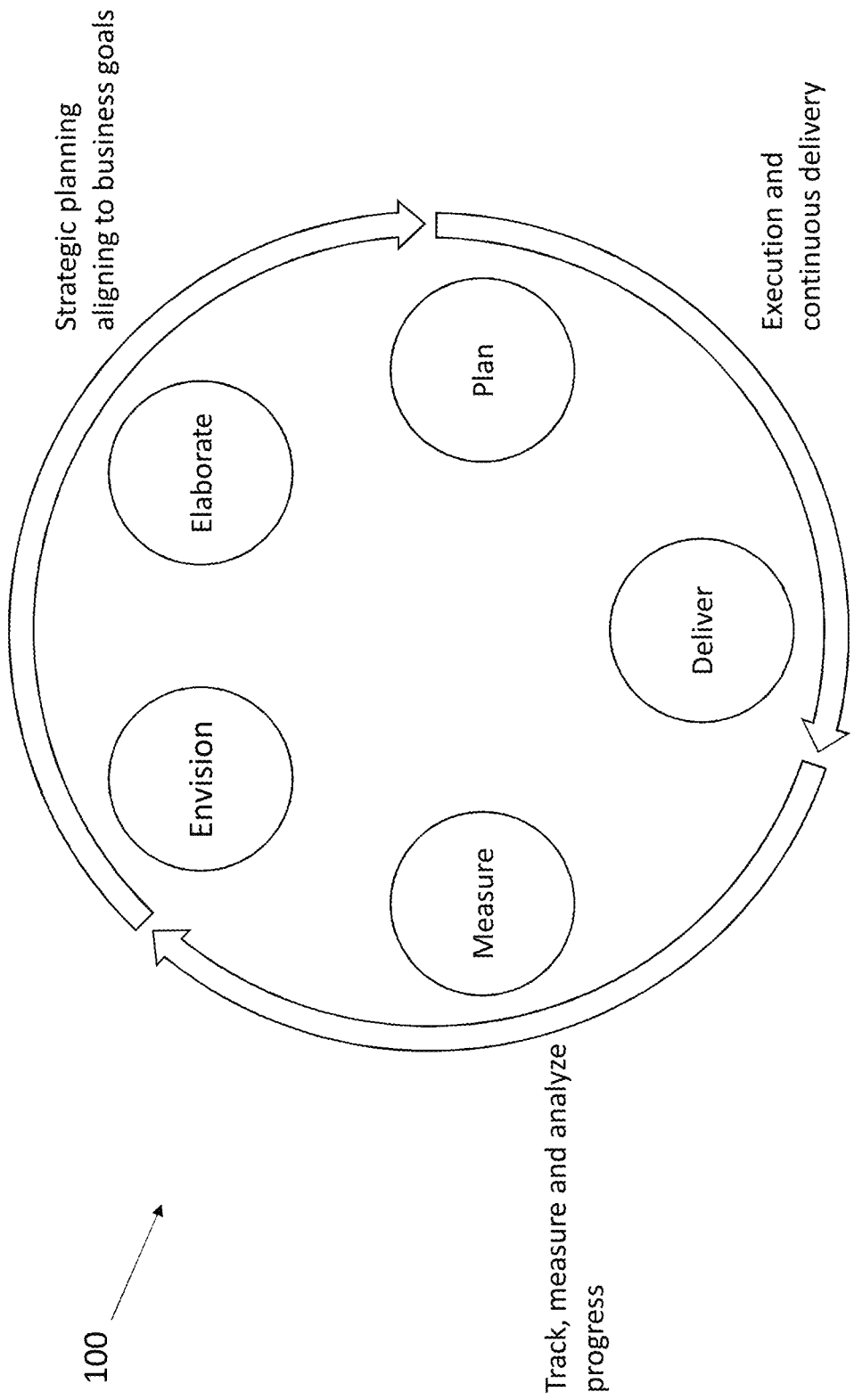
FIG. 2 shows a schematic view of various steps involved in the planning of end to end agile delivery according to an embodiment of the disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Glossary—Terms Used in the Embodiments

The expression "plurality of teams" or "teams" or "the plurality of scrum teams" in the context of the present disclosure refers to a small team of individuals who are working in the agile delivery environment. Each of the plurality of scrum teams have different role and responsibilities. Each of the scrum teams is managed by a scrum master.

The expression "a set of vision" or "visions" in the context of the present disclosure refers to the statements which are provided by the higher management of the organization. Vision refers to the place where company/organization would like to see themselves after a period of time. Vision statement is an organization's declaration of its mid-term and long-term goals. The vision statement should be provided in such a way that they should be motivating and inspiring to the team members.

The expression "the set of goals" or "objectives" in the context of the present disclosure refers to objective that the plurality of teams need to achieve to build a product that deliver business value and meeting the visions of the company over a period of time.

The expression "initiative" or "the plurality of initiatives" in the context of the present disclosure refers to high level business priorities derived from the vision statement. The initiatives serve as input to backlog items at the program level.

The expression "set of requirements" or "requirements" or "the plurality of features" or "features" in the context of the present disclosure refer to the requirements which is desired in the product and shared with the teams. The requirements can be functional or non-functional requirements. The set of requirements are maintained in a product backlog.

The expression "stories" or "the plurality of stories" or "user stories" in the context of the present disclosure refers to the informal descriptions of user requirements. In the planning process, these stories are prioritized using the perceived value to the user and assigned to releases. Based on estimates of how long each story in an increment will take to implement, an sprint plan is developed for delivering that release.

The expression "sprint" or "iterations" in the context of the present disclosure refers to set amount of time where the work is accomplished. Agile projects are broken down into small, consistent time intervals. These intervals are referred to as sprints or iterations.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

According to an embodiment of the disclosure, a block diagram of system 100 for managing a program in an agile delivery environment is shown in FIG. 1. Normally, the program involves the delivery or launch of a product. The program involves various steps staring from envisioning, elaborating, planning, delivering and measuring of the product. An end to end life cycle of the product can be shown in schematic diagram of FIG. 2. The system 100 is configured to manage end to end agile delivery of the product in the program in a self-optimized integrated platform. The system 100 works to achieve a set of goals and the goals are always come with some constraints. Before taking any decision, the system 100 decides the most optimal option to achieve the set of goals. In addition to that the system 100 is also configured to scale agile at an enterprise level. Ideally, agile is implemented at three levels: team level, program level and portfolio level. The disclosure provides an efficient and robust system 100 for scaling agile delivery environment for a large enterprise.

According to an embodiment of the disclosure, the system 100 achieves scaling across following five different dimensions. Each of the five dimensions are crucial for scaling the agile delivery environment from small team level to an enterprise level having a plurality of teams:

Dimension 1: Teams:

In a typical small scale agile setup each team comprises of seven to nine members and co-located. In large enterprises teams operate with 100s of members managing one or many systems. The system 100 provides scaling across the teams Dimension 2: Requirements:

The plurality of scrum teams suggests requirements in the form of a prioritized product backlog. The system 100 manages a large number of requirements coming from multiple levels of the organization and at the same time ensuring the traceability and dependencies between and within the levels are tracked.

Dimension 3: Planning:

The plurality of scrum teams suggests planning and delivery of working software in every 2-4 week sprint. For smaller products it is easier to identify the immediate set of features and plan to deliver the same to market. At large enterprises, as there are multiple vendors and systems, inspect and adapt cannot happen in frequent small phases. Hence planning time boxes need to be multi-fold from a timeline defined through roadmap comprised of multiple release cycles in turn planning for 1-4 week sprint.

Dimension 4: Deployment (DevOps) Principles:

True measure of delivery progress in the agile delivery environment is only a working software. For small co-located teams integrating and deploying continuously is simple, as it is a single product with mediocre code base. Understanding the quality of the build is also relatively easy. At large enterprises multiple teams coordinate to bring a working version of systems at the end of every sprint. The system 100 could also have multiple components, technology stacks with large number of deployment steps involving multiple environments.

Dimension 5: Quality:

The system 100 provides testing and issue fixing within every sprints. For large enterprises it is not just enough if we bring in sprint level testing but would require release level testing as well as different end to end testing such as system testing, regression testing, NFR testing etc.

The system 100 is configured to perform various actions to achieve scaling across all five dimensions. According to an embodiment of the disclosure, the integrated platform is provided to manage the plurality of scrum teams located at a plurality of different geographical locations. The integrated platform helps hundreds of members of the plurality of scrum teams, who are organized into multiple agile teams working in a synchronized manner, to build the product.

According to an embodiment of the disclosure, the system 100 further comprises an input module 102, a vision board 104, a memory 106 and a processor 108 as shown in the block diagram of FIG. 1. The processor 108 works in communication with the memory 106. The processor 108 further comprises a plurality of modules. The plurality of modules accesses the set of algorithms stored in the memory 106 to perform certain tasks. The processor 108 further comprises a requirements derivation module 110, a profiling and matching module 112, a machine learning module 114, a dependency management module 116, an MVP delivering module 118, a product build release management module 120 and a scaling module 122.

According to an embodiment of the disclosure, the input module 102 is configured to provide a plurality of inputs to the system 100. Typically the agile delivery environment involves a plurality of product owners. The product owners are responsible for managing a product backlog. The agile delivery environment further comprises a plurality of scrum teams working in the agile environment. The scrum teams are managed by the scrum masters. The input module 102 is configured to provide a set of visions to the plurality of scrum teams working in the program. The input module 102 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

Figure 6:
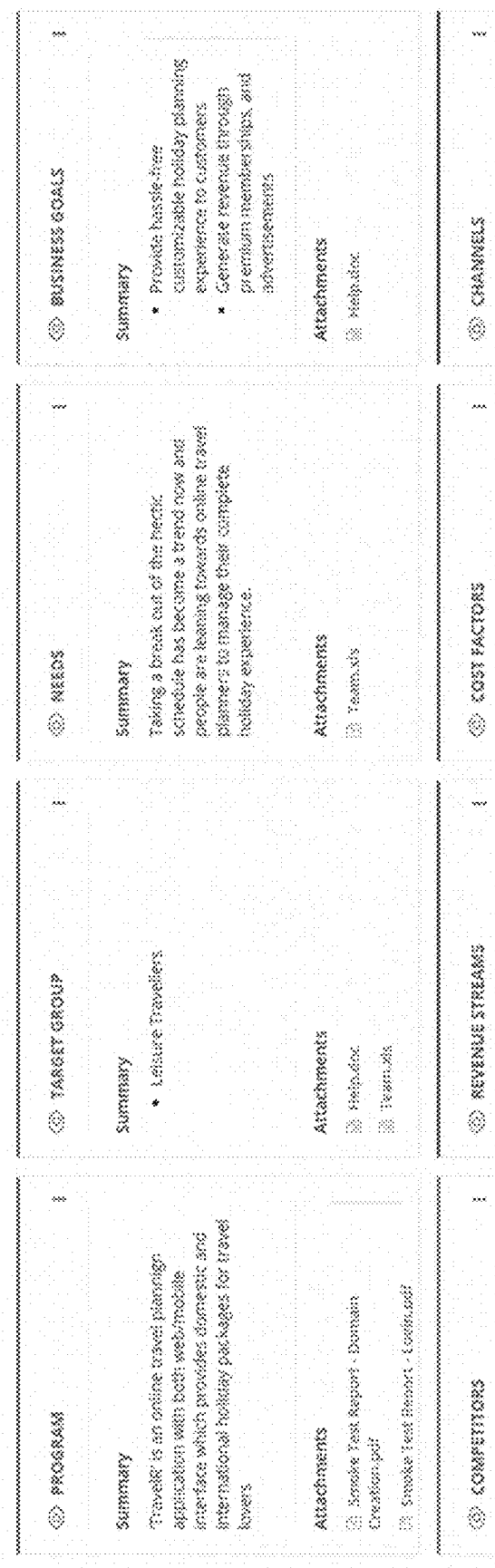
FIG. 6 shows an example of the vision board according to an embodiment of the disclosure.

The set of visions are provide on the vision board 104 as shown in example of FIG. 6. The vision board 104 is a part of a display screen 124. The set of visions are provided by the senior management or business executives of the organization. The vision board 104 is visible to all the teams working on the program within the organization. The vision board 104 keeps the plurality of scrum teams to be committed and motivated towards achieving the vision. The elements of the vision board 104 are inspiring and motivating. Once the set of visions are created and the high level initiatives to realize the vision is defined, the individual teams will need to be empowered to make all decisions to realize the initiative and hence move towards the vision. The vision board 104 also provides a roadmap view, which enables teams visualize which work is getting implemented in with release and hence what business objectives are being made.

Figure 3:
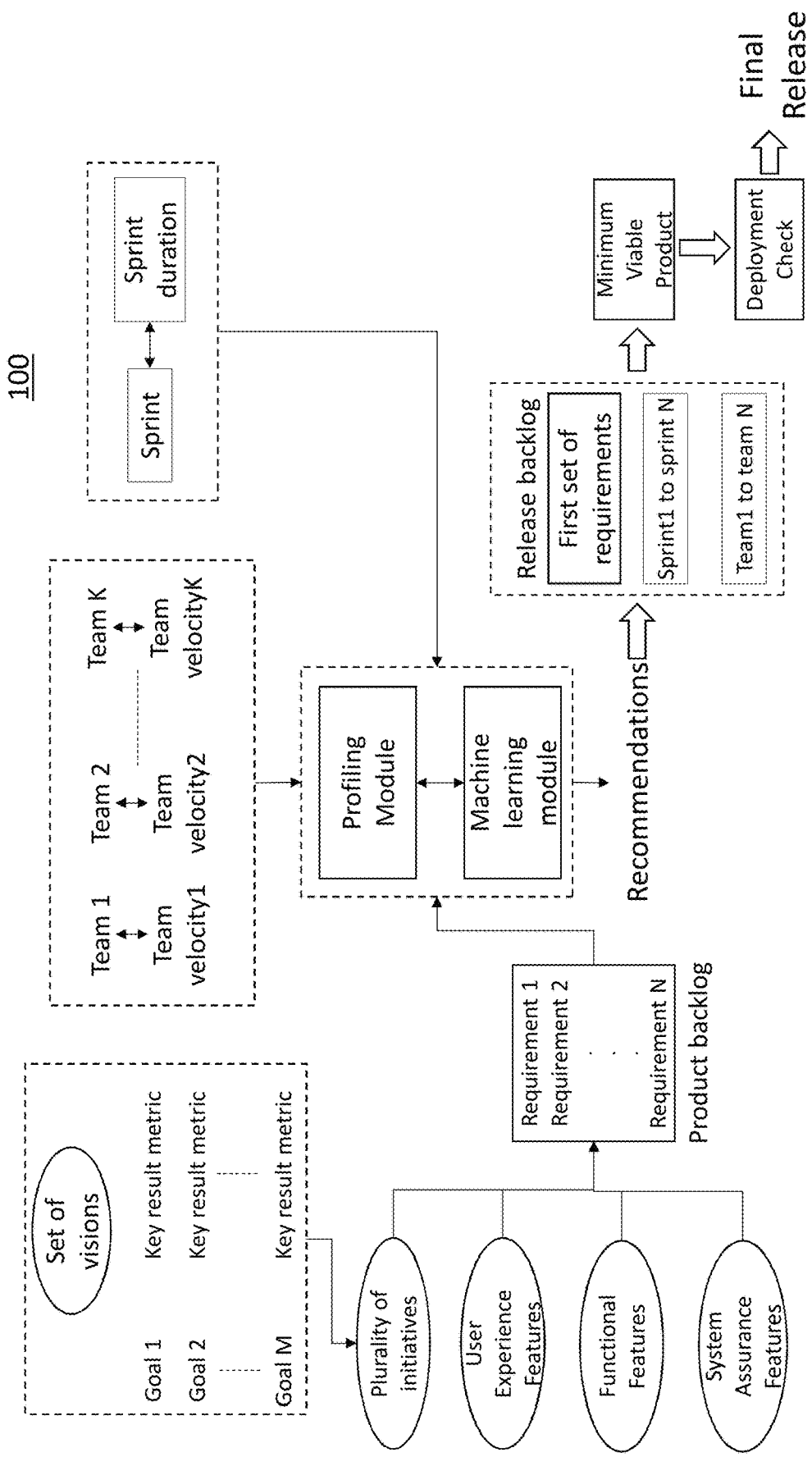
FIG. 3 illustrates an schematic architecture of the system for managing a program in an agile delivery environment according to an embodiment of the present disclosure.

According to an embodiment of the disclosure, the input module 102 further configured to provide a set of goals as shown in the schematic diagram of FIG. 3. The set of goals or the objectives are aligned to the set of visions. Each of the set of goals have a key result metric, the key result metric is a measurement of the set of goals. The key result metric measure the progress of the set of goals. A predefined timeline is also provided to complete the set of goals. The system 100 captures the set of visions and defines what measures that would determine whether the vision meets the stated set of goals. The input module 102 further configured to provide a sprint duration to be used during the release of the program. The sprint duration determines the number of sprints or iterations required. The number of sprint may vary over a period of time.

According to an embodiment of the disclosure, a plurality of initiatives are defined based on the set of goals to achieve the key result metric. The plurality of initiatives would help the scrum teams to achieve that objective or the set of goals. Hence the team can relate to the value they create and have a sense of directly contributing to the organization, creating an intrinsic motivation within the team. The system 100 ensures a seamless alignment from the vision to how the feature helps achieve the objectives defined by the vision.

The plurality of initiatives are broken down to implementable features or a set of requirements, prioritized and planned into release schedules. Releases are progressed as sprints, where at the end of each sprint multiple teams together release one version of working system, and at the end of a release as a minimum viable product (MVP). As the minimum viable product is released, the value is observed and logged against the objective on the timeline. Inspection and adaption is performed at every sprint, every release and every timeline milestone. The system 100 provides the capability to track these schedules real-time in a simple understandable manner.

According to an embodiment of the disclosure, the system 100 includes the requirements derivation module 110. The requirements derivation module 110 derives the set of requirements from a plurality of sources, wherein the set of requirements is maintained in the product backlog. The product backlog is maintained by the product owners. The product owner captures the set of requirements/features from the multiple sources broadly classified as strategic initiatives, user centric personas or business components. Thus, there will be user experience features, functional features and business component features as shown in the schematic diagram of FIG. 3. This would enable the plurality of scrum teams to visualize the end benefiter of the requirements and derive a direct sense of value add that they are contributing to that particular entity (business/persona/component).

In addition to that, the set of requirements also need to be managed at multiple levels. The backlog of requirements are maintained at multiple level. Firstly large strategic initiatives at the management (portfolio level). These initiatives are broken down into features and stories (team level) that are implemented in sprints. The requirements derivation module 110 also manages the backlog of initiatives, the backlog of features and the backlog of stories.

Further, it should be appreciated that the set of requirements can be prioritized based on the business need and size and can be taken up for implementation based on the priority. The set of requirements are sized and prioritized using agile estimation techniques. The criteria for sizing and prioritization varies for multiple levels. Initiatives are sized based on broad amount of development effort and cost of implementation, and ranked based on the value the initiative will provide. The value is indication of the return on investment, the urgency of need etc. Similarly, the features and stories are sized and ranked based on the value to end users and the business benefit they would offer.

According to an embodiment of the disclosure the system 100 further configured to additionally manage a set of non-functional requirements (NFR). The agile team needs to ensure that both functional and non-functional requirements are captured right from the start of the program. The system 100 captures the constraints in addition to the set of requirement that the product needs to meet. And these constraints can be applied to the relevant features and stories such that they are taken into consideration while developing the feature and story. The system 100 enables defining the business or technical constraints at the product level and these can be applied to the applicable feature or story. The test cases of the constraint automatically gets linked to the feature or story. And the story or feature is only complete if it meets the functional requirements as stated as well as the constraint applied.

According to an embodiment of the disclosure, the system 100 comprises the profiling module 112 as shown in the schematic diagram of FIG. 3. The profiling module 112 along with the machine learning module 114 helps in planning the optimal release of the product. The profiling module 112 performs profiling of the plurality of teams, the product backlog and the sprint duration. In the context of present disclosure, the profiling of plurality of teams and profiling of product backlog can be explained as follows:

Each of the plurality of teams have their own team velocity. The team velocity is dynamic and keep on updating with every sprint. For example, team A completes a particular requirement with the team velocity of $A_v$. Now in some other upcoming sprint, if the same requirement is provided in the product backlog, then the team velocity of team A will be better than the previous sprint when the same requirement arrived. The product backlog has the set of requirements, and these requirements keep on updating in the form of user stories with every sprint. The profiling happens on the set of requirement and on the plurality of teams. Based on the profiling, the particular requirement is matched with one of the team out of the plurality of teams.

As the requirement is provided in the product backlog in the form the user story, the profiling module 112 will look at the profile of the plurality of teams along with their team velocity with respect to the provided requirement. The machine learning module 114 will recommend that for the provided requirement, and after looking at various team profiles, which of the teams has the best matching percentage. Thus the machine learning module 114 will give multiple potential matches of the provided requirement with the teams. Based on the potential matches, either the scrum master takes a decision or there may be an inbuilt capability which takes the decision of which team to allocate for the provided requirement. The decision will imbibe the profile creation of a new user story.

The profiling module 112 is further configured to calculate a total number of story points and a planned story points. The total number of story points are the story points that can be completed by the teams in the determined number of sprints. As mentioned, the story points are the informal descriptions of user requirements. The total number of story points are calculated by multiplying the number of sprints with sum of the predefined velocity of each of the teams. This can be explained as follows:

Say there are N number of teams, with team velocity of Teamvelocity1 for team 1, Teamvelocity2 for team 2, similarly TeamvelocityK for team N.

Number of sprints determined at the start of the project=S Then, $$\text{Total number of story points}, A=[S^*(\text{Teamvelocity1}+\text{Teamvelocity2}\ldots+\text{Teamvelocity}K)]$$

Before the start of the project each of the requirements of the project are present in the product backlog. According to an embodiment of the disclosure, when the user plan the release of the product in the agile delivery environment. The user provides a first set of requirements out of the set of features in a release backlog using the input module 102. The first set of requirements are intended to be released in the next sprint or the next release. The release backlog contains the set of requirements which are intended to be released in the next sprints or in that particular release. The profiling module 112 further calculates the planned story points (B) based on the first set of features provided in the release backlog.

According to an embodiment of the disclosure, the machine learning module 114 is further configured to compare the planned story points (B) with the total number of story points (A). There are three possible scenario based on the comparison. First, the planned story points are equal to the total number of story points (A=B), it implies that the planning of the release of the product is fine and no further modification required. Second, the planned story points are less than the total number of story points (A>B), it implies that there is further scope available for the team, the user may add one or more requirements to the first set of requirements in the release backlog. And third, the planned story points are more than the total number of story points (A<B), it implies that the teams are overloaded with work and if the project goes ahead with this planning then it will not be possible for the teams to finish the project by the end date. In this case the user modifies at least one or more of the following three options to enable the optimal release of the project.

Firstly, the user reduces one or more requirements of the first set of requirements from the release backlog until the planned story points become less than or equal to the total number of story points. This type of project planning may be referred to as "feature driven". The organizations aim to deliver a defined set of requirements which are of utmost business value and urgency based on market changes. The teams need to deliver all the set of requirements in the release backlog within flexible timeframe i.e. the sprint duration can differ, since release end date is decided based on the how many sprints the team would require to complete the set of features. This would help determine the number of sprints that would make up the release, by when the expected set of requirements would be completed.

In the second option, the user adds one or more teams to the list of teams who would participate in the release. This results in increase in the average team velocity and thus results in increase of the total number of story points. This type of project planning may be referred to as "date driven". Here, the release date is fixed. The teams need to complete the features by the end date, so, no additional sprint can be added as mentioned above. In this case, there could be two options. In case feature list is committed and needs to be met within the timeframe, the user looks at the possibility of adding one or more teams to the release to meet the expected story points. Else, in most cases only the prioritized stories/features which can be handled in the release based on the team capacity are retained in the release and remaining moved out of the release.

In the third option, the user adds one or more sprint to the number of sprints required for the release if the end date or release date is not fixed. By increasing the sprints, the total number of story points will also increase.

According to an embodiment of the disclosure, the system 100 also comprises the MVP delivering module 118. The MVP delivering module 118 is configured to deliver the minimum viable product (MVP) corresponding to the program at the end of every sprint.

According to an embodiment of the disclosure, the system 100 further comprises the product build release management module 120. The product build release management module 120 is configured to manage the release of a product build through an automated deployment pipeline by defining the various stages that the product build would go through in a single click start. As the plurality of features and stories are implemented across sprints, with every commit this orchestrated pipeline gets triggered. The product build release management module 120 also makes sure that the teams can view how deployment ready the product build is as it progresses in the sprint. This provides a seamless deployment to production as the product build can be moved automatically from one stage of pipeline to the other if pre-requisites are met. The product build release management module 120 orchestrates and automates the release of the product build. This involves the automation of integration and the product build creation, the product build quality checks, regression tests and deployment across the various environments.

As multiple deployment pipelines are set-up, the system 100 also have the capability to create and store Plug-ins for a plurality of external tools which are the commonly used tools in the system 100. Frequently used tasks for this delivery process on these tools should be automated and managed as part of the plug-in. This makes the orchestrations for teams further simpler and faster by being able to create a pipeline from existing plug-ins.

It should be appreciated that the system 100 should also have the capability to comprehend outputs from multiple deployment pipelines and store them post every deployment trigger. Visualization of the pipeline along with the reports from these tools provide the capability for teams to understand problems involved in the process, resolve bottle necks and gauge the quality of the build and the delivery process. Further, the agile tools with continuous delivery support also support analytics that have the metrics on build, test and deployment quality over a period of time. This analysis helps understand areas for continuous improvement.

In addition to that, as tools help automate the continuous delivery process, analysing reports from multiple tools and also analysing the progress of this process across time, the tools is also configured to store improvement goals. For example, build quality is good only if unit test coverage is more than 80%. Once this goal is set, the tools should provide the current metric against this goal with every deployment trigger, and alert if the metric is reducing rather than moving towards the goal.

According to an embodiment of the disclosure, the system 100 also comprises the scaling module 122 for scaling the agile delivery environment from the plurality of scrum teams level to a portfolio level. The scaling is achieved in collaboration with various modules of the system 100 as mentioned above. In the agile delivery environment, the system 100 should be implemented at three levels: the plurality of scrum teams level, program level and a portfolio level. Moving effectively from the first level to the last there should be a smooth transition to achieve the scaling.

According to an embodiment of the disclosure, the system 100 further includes the dependency management module 116. The dependency management module 116 is configured to manage the dependency of the plurality of scrum teams, a plurality of supporting teams supporting the plurality of scrum teams, and a plurality of third party teams. The dependency management module 116 ensures that there is no wait time in each delivery cycle. The dependency management module 116 visualizes and comprehend dependencies between teams over various artefacts. When dependent work is planned in sprints, the dependency management module 116 alerts the dependencies present as these dependencies would result in a wait time. This would give the teams an option to plan work optimally reducing wait times.

In an agile delivery environment, there are a plurality of stakeholders around the plurality of scrum teams. There are lot of supporting teams supporting the plurality of scrum teams meet their commitments. These scrum teams require sync up meetings with the supporting teams. In addition to that the dependency management module 116, can also manage other niche support teams or third party teams who should be part of the same system, enabling transparency across teams, managing the dependencies effectively and aligning each team to the impact they create while handling the dependency.

According to an embodiment of the disclosure, the system 100 also comprises a communication tool 126. The communication tool 126 gives importance to individuals and interactions and is extremely important for agile delivery environment. The communication tool 126 helps to coordinate and meet together multiple times daily to synchronize delivery, identify and address dependencies as well as retrospect and adapt. The communication tool 126 provides face-to-face interactions with geographically distributed teams, collate synchronized plans and artefacts and collaborate towards daily activities. It should be appreciated that the communication tool 126 can be in the form of audio, video or any other form.

According to an embodiment of the disclosure, the system 100 also provide a feature to store the traceability between the plurality of initiatives, the plurality of features and the plurality of stories and view the progress of all of them in real-time. It should be appreciated that the system 100 is also configured to store the dependencies, so that related features and stories are planned in the same sprint. The system 100 also provides a quick access to the initiative progress from the initiative board where the plurality of initiatives are provided, without have to search through multiple reports to view the progress.

According to an embodiment of the disclosure, the system 100 is also configured to receive feedback at the end of every sprint. The system 100 stores retrospection details and received feedback at every sprint. It is important for teams to check how much of business objectives are met and record the results for the same. This helps team visualize feedback loops and make decisions for further work to be implemented.

According to an embodiment of the disclosure, the present agile framework tests and fixes issues within the sprints. To manage the continuous sprint testing for working systems with large teams, while detailing the release plan by planning work in each sprint, it is important to also create and plan a test suite for every sprint. A test suite for every sprint includes all tests that are required to test the collective work across teams in the sprint and all previous sprints of the release. This itself is substantial amount of work, and has to be sized. Planned of work that can be done, is also based on the amount of test work that needs to be done in every sprint.

As test suites are planned, post development, teams execute these tests, log issues, in the same tool, which need to be closed within the sprint itself. Sprint is complete only if all stories are done, which happens when all tasks complete, all tests pass and all issues are closed within the sprint.

The system 100 is also configured to perform continuous integration and deployment testing to realize a working fully tested version of working system. Further the continuous delivery process is also automated, and also plug-in all the required testing into this delivery pipeline.

Further, the system 100 also provide the capability to create libraries of integration, functional and system tests progressively with every sprint. These are collection of tests that need to be executed within the sprint and test the integration and process functional aspects of the working system. These packs are also sized. With every sprint, a test suite can be created into which this library can be pulled for execution within the sprint. This helps manage the needed integration, functional and system testing within the sprint. This also is in a way continuous regression testing.

Further the plurality of teams are also automates these tests on popular test automation tool platforms. These tests can be added into test suites and executed automatically at every sprints. These tests can also be added into the continuous delivery tool chain orchestration and triggered automatically when the deployment is triggered.

Figure 4A:
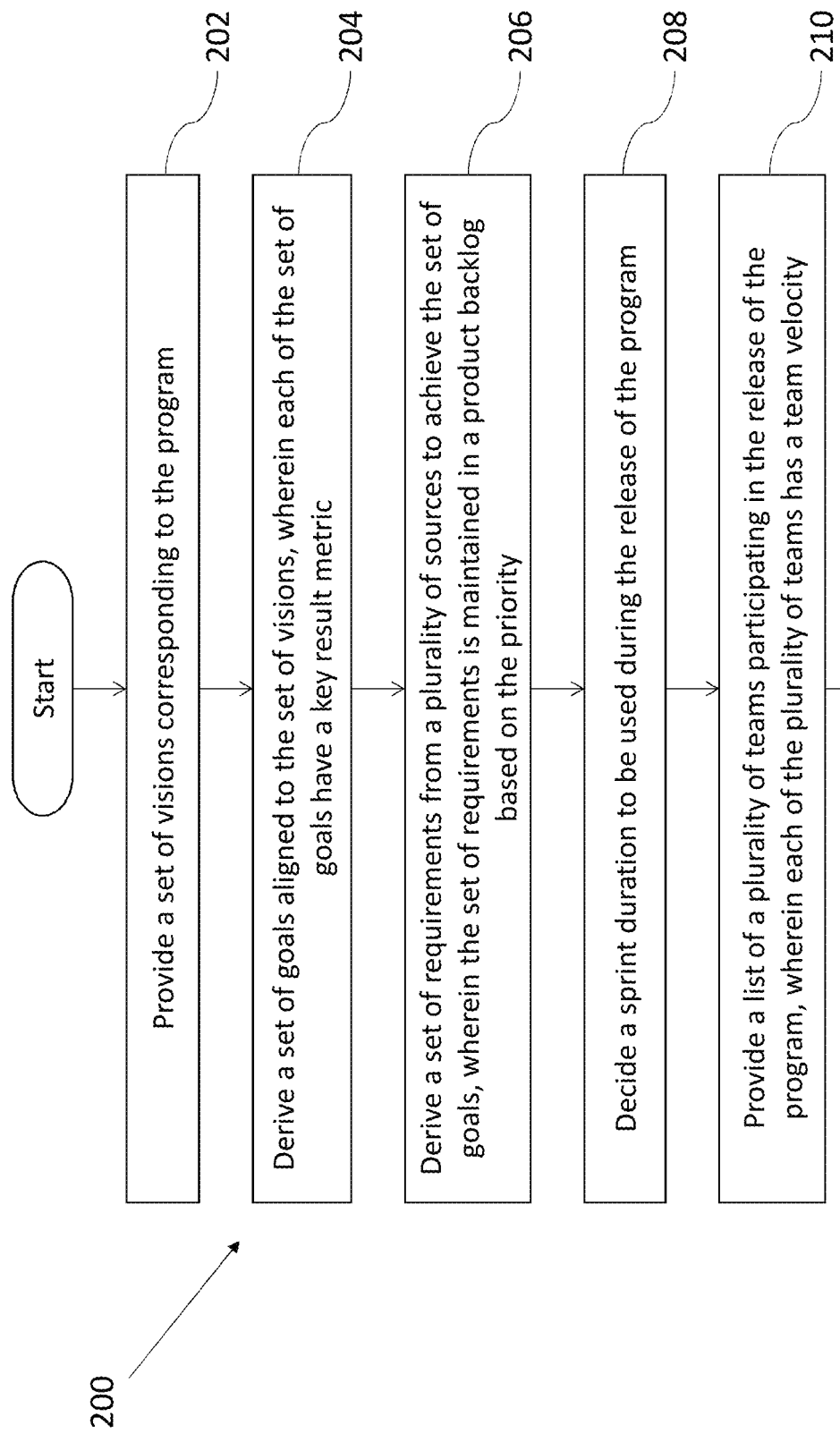
FIG. 4A-4B is a flowchart illustrating the steps involved for managing the program in an agile delivery environment according to an embodiment of the present disclosure.
Figure 4B:
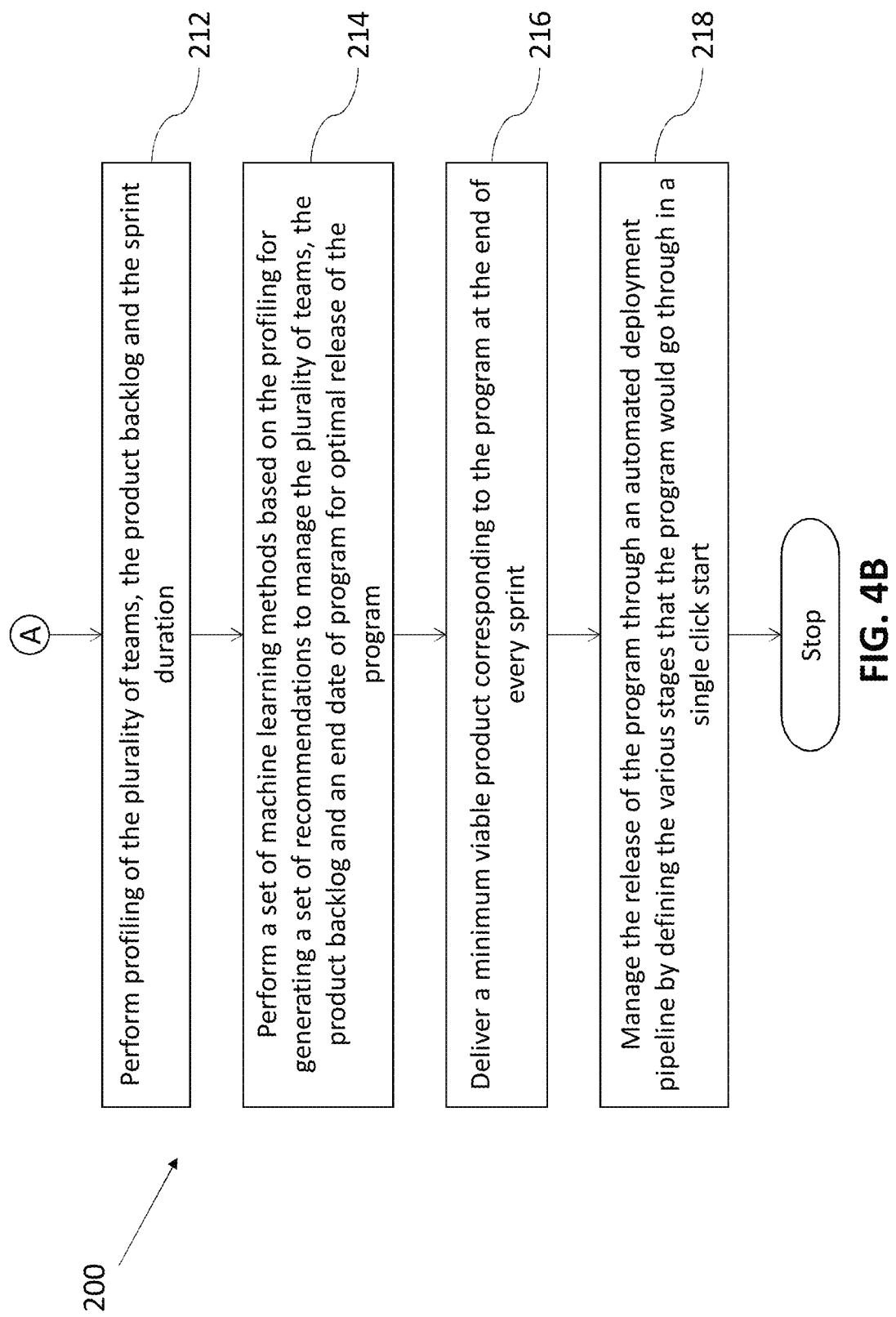

In operation, a flowchart 200 illustrating the steps for managing the program in the agile delivery environment is shown in FIG. 4A-4B. Initially at step 202, the set of visions are provided to the plurality of scrum teams working in the program. The set of visions are visible to each member of the plurality of scrum teams. At step 204, the set of goals or the objectives are derived, wherein the set of goals aligned to the set of visions, wherein each of the set of goals have a key result metric. The set of goals are chosen in such a way that it helps to reach the vision statement. At step 206, the set of requirements or the set of features are derived from a plurality of sources. The set of requirements are derived to complete the plurality of initiatives. The set of requirements is maintained in a product backlog based on the priority. The set of requirements can be derived either from strategic initiatives, user centric personas or business components. The set of requirements are referred as the functional requirement. In the next step 208, a sprint duration to be used is decided during the release of the program.

In the next step 210, the list of plurality of teams participated in the release of the program is provided. Each of the plurality of teams has a team velocity which determines the speed with which the team can work in the agile delivery environment. In the next step 212, a profiling of the plurality of teams, the product backlog and the sprint duration is performed using the profiling module 112. In the next step, a set of machine learning methods is performed based on the profiling for generating a set of recommendations for matching the plurality of teams with the set of requirements for optimal release of the program.

In the next step 216, the minimum viable product is delivered corresponding to the program based on the set of recommendations at the end of every sprint. The MVP is also a way of measure of the completion of the program. And finally at step 218, the release of a product build is managed through an automated deployment pipeline by defining the various stages that the product build would go through in a single click start. The automated deployment pipeline will check the quality of MVP on various parameters.

Figure 5A:
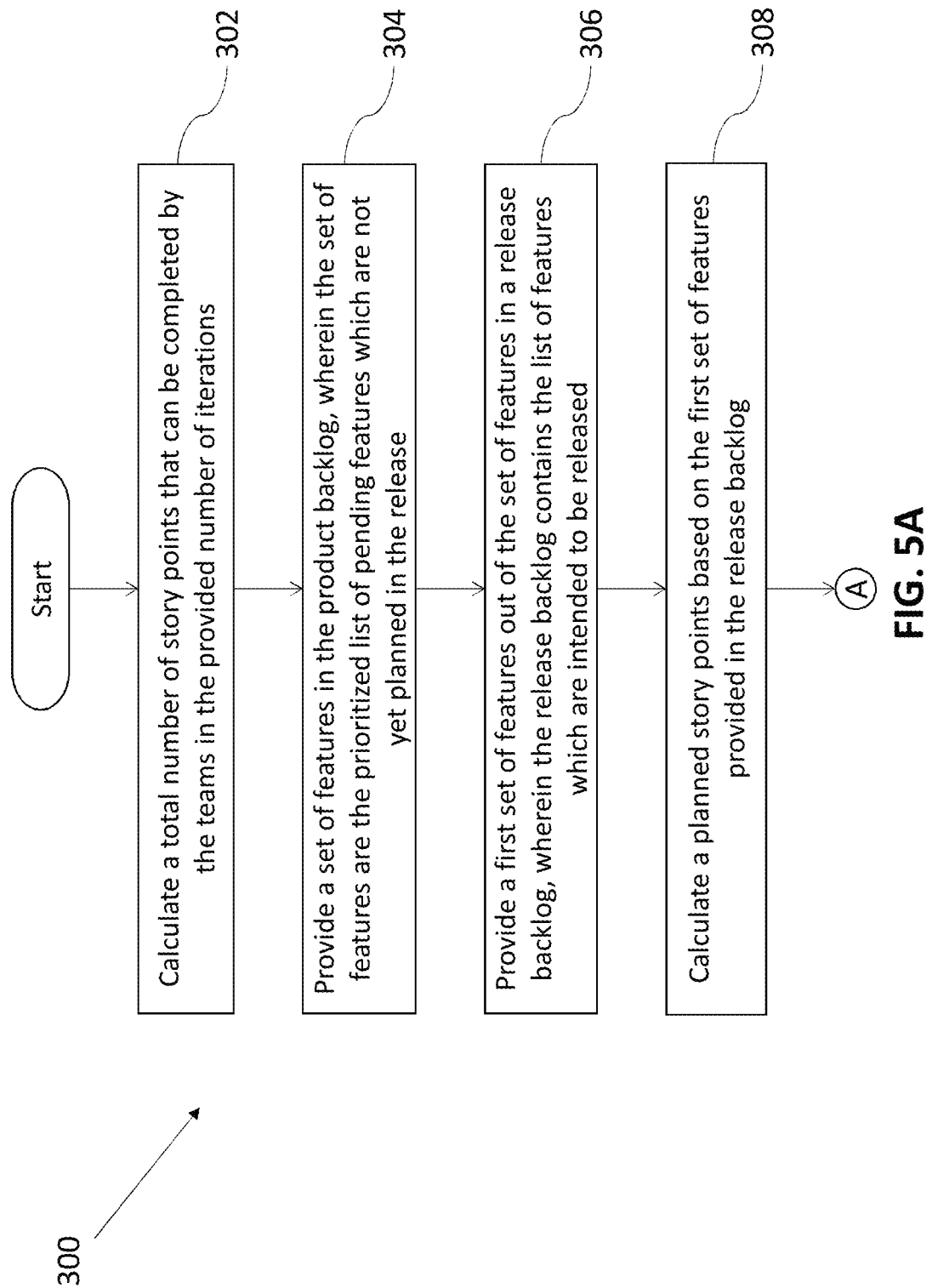
FIG. 5A-5B is a flowchart illustrating the steps involved for managing the program in an agile delivery environment according to an embodiment of the present disclosure.
Figure 5B:
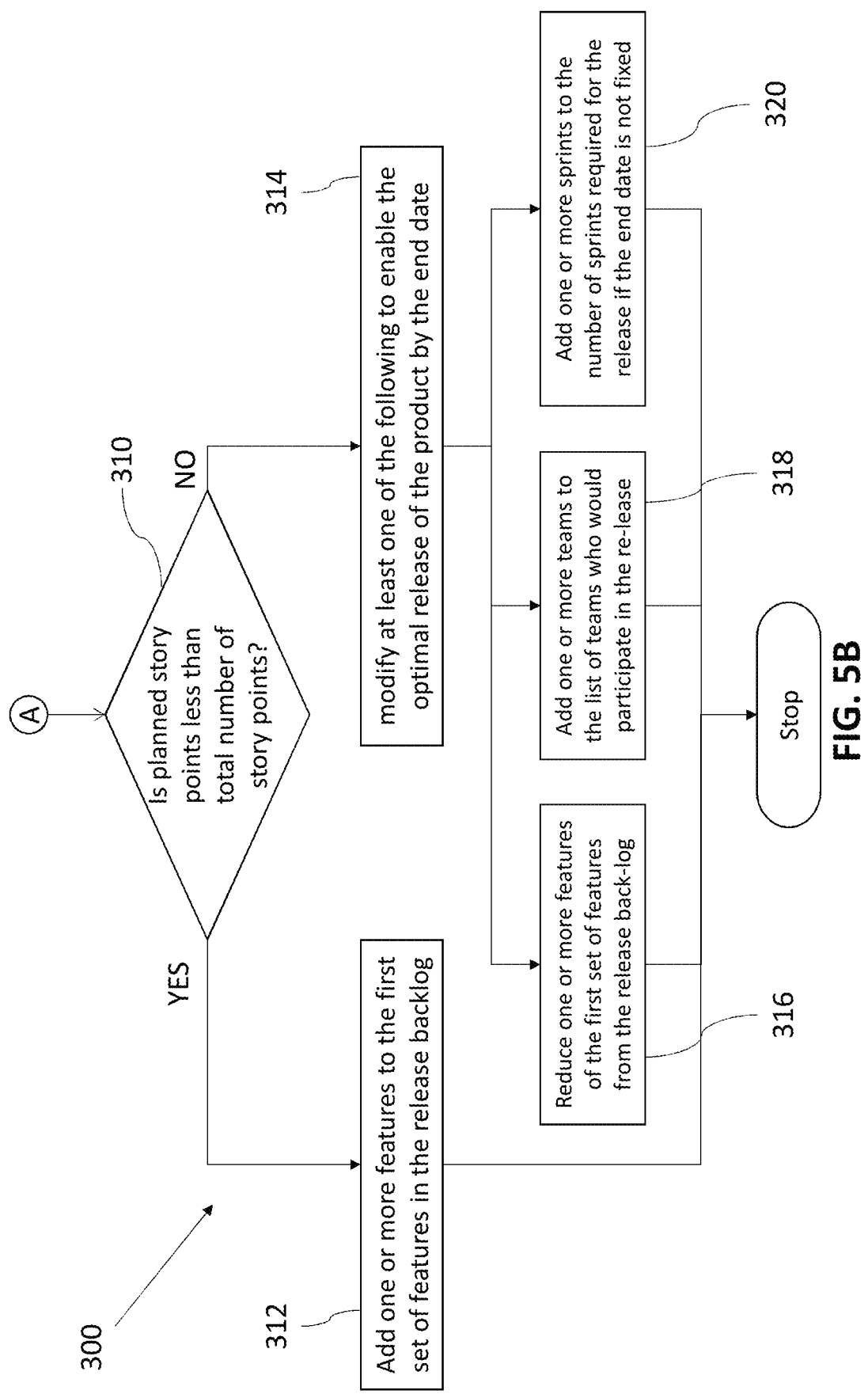

According to an embodiment of the disclosure, a flowchart 300 illustrating the steps for optimal planning of the release of the product using the profiling module 112 and the machine learning module 114 in the agile delivery environment is shown in FIG. 5A-5B. Initially, at step 302, the total number of story points are calculated that can be completed by the teams. The total number of story points are calculated by multiplying the number of sprints with sum of the predefined velocity of each of the teams. In the next step 304, a set of requirements are provided in the product backlog. The set of requirements are the prioritized list of pending requirements which are not yet planned in the release. In the next step 306, the first set of requirements out of the set of requirements are provided in the release backlog. The release backlog contains the set of requirements which are intended to be released in the next sprint or the in the current version of the release.

In the next step 308, the planned story points are calculated based on the first set of features provided in the release backlog. Finally at step 310, the planned story points are compared with the total number of story points using the machine learning module 114. Based on the comparison, there could be two options. Based on the options, at least one of the following step can be performed. At step 312, either one or more requirements are added to the first set of requirements in the release backlog if the planned story points are less than the total number of story points. Or at step 314, at least one of the following is modified to enable the optimal release of the product by the end date in the agile delivery environment if the planned story points are more than the total number of story points. At step 316, one or more requirements of the first set of requirements are reduced from the release backlog. At step 318, one or more teams are added to the list of teams who would participate in the release. Or at step 320, one or more sprints are added to the number of sprints required for the release if the end date is not fixed.

The system 100 can also be explained with the help of following example as shown in the vision board of FIG. 6. Assuming the program is to provide a complete IT support to a travel agency. The vision of the company would be—"To become the leading holiday planning company, serving customers with exotic, customizable holiday packages so that they can have a relaxing get away from their hectic day to day life". To achieve this vision a set of goals will be decided. For example—"providing hassle free customizable holiday planning experience", "Generate revenue through premium membership", etc. Now, the plurality of initiatives will be defined. For example, "build a mobile app", "build a website", "building a user friendly user interface" etc. And finally the plurality of requirements will be provided from the plurality of sources. The plurality of teams then will work on those requirements to complete the plurality of initiatives, in turn achieving the vision statement of the enterprise.

Figure 7:
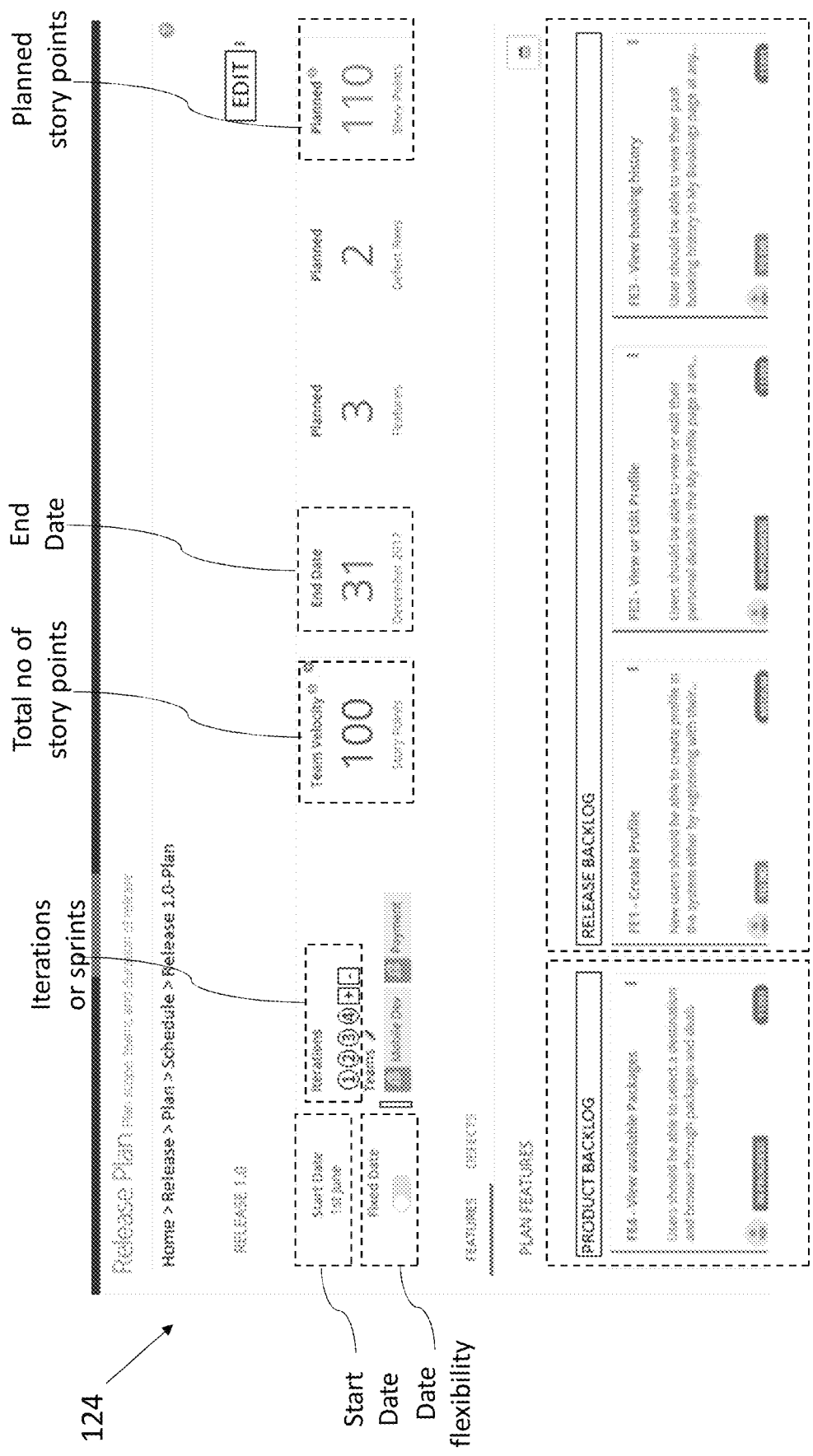
FIG. 7 shows an example of a display screen displaying an example data according to an embodiment of the disclosure.

According to an embodiment of the disclosure, an example of the display screen 124 is shown in FIG. 7. As shown in the figure, the left hand side shows start date and an option to make end date as fixed or flexible. The figure also shows the total number of story points as 100, while the planned story points are 110. Bottom portion of the figure shows the product backlog and the release backlog.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing a program in an agile delivery environment, the method comprising a processor implemented steps of:
    providing a set of visions corresponding to the program (202);
    deriving a set of goals aligned to the set of visions, wherein each of the set of goals have a key result metric (204), wherein the key result metric is a measure of progress of each of the set of goals;
    deriving a set of requirements from a plurality of sources to achieve the set of goals, wherein the set of requirements is maintained in a product backlog based on a priority (206);
    deciding a sprint duration to be used during a release of the program (208);
    providing a list of a plurality of teams participating in the release of the program, wherein each of the plurality of teams has a team velocity (210), wherein the team velocity is indicative of a speed of the team in completing a number of story points in the agile delivery environment, and wherein the team velocity is dynamic and keeps on updating with every sprint;
    performing profiling of the plurality of teams, the product backlog and the sprint duration (212);
    performing a set of machine learning methods based on the profiling for generating a set of recommendations for matching the plurality of teams with the set of requirements for optimal release of the program (214), wherein generating the set of recommendations using the set of machine learning methods comprises comparing a planned story points with a total number of story points and performing following steps based on the comparison (310):
        adding one or more requirements to the first set of requirements in a release backlog if the planned story points are less than the total number of story points (312); and
        modifying at least one of the following to enable a optimal release of the program in the agile delivery environment if the planned story points are more than the total number of story points (314):
            reducing one or more requirements of the first set of requirements from the release backlog (316);
            adding one or more teams to the list of teams who would participate in the release (318); and
            adding one or more sprints to the number of sprints required for the release if an end date of the program is not fixed (320);
    delivering a minimum viable product corresponding to the program based on the set of recommendations at the end of every sprint (216); and
    managing the release of the program through an automated multiple deployment pipelines by defining various stages that the program would go through in a single click start (218).

2. The method of claim 1, further comprising the step of deciding a start date and an end date of the project, wherein the end date is either fixed or flexible.

3. The method of claim 1, wherein the step of profiling further comprises:

calculating a total number of story points by multiplying a number of sprints with sum of a team velocity of each of the teams (302);

providing a first set of requirements out of the set of requirements in a release backlog, wherein the release backlog contains the requirements which are intended to be released in a particular release (304); and calculating a planned story points based on the first set of requirements provided in the release backlog (308).

4. The method of claim 1 further comprising the step of managing additionally, a set of non-functional requirements in the set of requirements.

5. The method of claim 1 further comprising the step of managing the dependency of the plurality of teams, a plurality of supporting teams supporting the plurality of teams, and a plurality of third party teams using a dependency management module (116).

6. The method of claim 1 further comprising the step of scaling the agile delivery environment from the plurality of team's level to a portfolio level.

7. The method of claim 6, wherein the scaling is performed across following dimensions: teams, requirements, planning, deployment operation principles and quality.

8. The method of claim 7, wherein the step of scaling further comprising following steps to achieve scaling across one or more of the dimensions:

providing a centralized platform to manage the plurality of scrum teams located a plurality of different geographical locations;

providing a communication tool to facilitate communication between the plurality of scrum team at regular intervals;

tracing the plurality of initiatives, the set of requirements and a plurality of stories and viewing the progress of all of them in real time;

storing a set of Plug-ins for a plurality of external tools to be used in the program; and storing the output from the automated deployment pipeline for future reference.

9. The method of claim 1 wherein the plurality of sources comprise strategic initiatives, user centric personas and business components.

10. The method of claim 1, further comprising the step of displaying the set of visions on a vision board.

11. The method of claim 1, further comprising the step of determining if the set of visions are met or not based on the set of goals and the key result metric.

12. The method of claim 1 further comprising the step of tracking the progress of the plurality of initiatives at a regular interval during a predefined timeline.

13. The method of claim 1, wherein the set of requirements are prioritized in the product backlog depending on their relevancy to the program.

14. The method of claim 1 further comprising the step of providing feedback at the end of every sprint.

15. A system (100) for managing a program in an agile delivery environment, the system comprises:

an input module (102) configured to provide:
a set of visions corresponding to the program,
a list of a plurality of teams participating in a release of the program, wherein each of the plurality of teams has a team velocity, and
a sprint duration to be used during the release of the program;

a vision board (104) for displaying the set of visions;
a memory (106); and a processor (108) in communication with the memory, the processor further configured to perform the steps of:

deriving a set of goals aligned to the set of visions, wherein each of the set of goals have a key result metric, wherein the key result metric is a measure of progress of each of the set of goals;

deriving a set of requirements from a plurality of sources to achieve the set of goals, wherein the set of requirements is maintained in a product backlog based on a priority;

providing a list of a plurality of teams participating in the release of the program, wherein each of the plurality of teams has a team velocity, wherein the team velocity is indicative of a speed of the team in completing a number of story points in the agile delivery environment, and wherein the team velocity is dynamic and keeps on updating with every sprint;

performing profiling of the plurality of teams, the product backlog and the sprint duration using a profiling module (112);

performing a set of machine learning methods based on the profiling for generating a set of recommendations for matching the plurality of teams with the set of requirements for optimal release of the program using a machine learning module (114), wherein generating the set of recommendations using the set of machine learning methods comprises comparing a planned story points with a total number of story points and performing following steps based on the comparison:

adding one or more requirements to the first set of requirements in a release backlog if the planned story points are less than the total number of story points; and modifying at least one of the following to enable a optimal release of the program in the agile delivery environment if the planned story points are more than the total number of story points:

reducing one or more requirements of the first set of requirements from the release backlog;

adding one or more teams to the list of teams who would participate in the release; and adding one or more sprints to the number of sprints required for the release if an end date of the program is not fixed;

delivering a minimum viable product corresponding to the program based on the set of recommendations at the end of every sprint using a minimum viable product (MVP) delivering module (118); and managing the release of the program through an automated multiple deployment pipelines by defining various stages that the program would go through in a single click start using a product build release management module (120).

16. A non-transitory computer-readable medium having embodied thereon a computer program for developing an Internet of Things (IoT) analytics application, the method comprising a processor implemented steps of:

providing a set of visions corresponding to the program (202);

deriving a set of goals aligned to the set of visions, wherein each of the set of goals have a key result metric (204), wherein the key result metric is a measure of progress of each of the set of goals;

deriving a set of requirements from a plurality of sources to achieve the set of goals, wherein the set of requirements is maintained in a product backlog based on a priority (206);

deciding a sprint duration to be used during a release of the program (208);

providing a list of a plurality of teams participating in the release of the program, wherein each of the plurality of teams has a team velocity (210), wherein the team velocity is indicative of a speed of the team in completing a number of story points in the agile delivery environment, and wherein the team velocity is dynamic and keeps on updating with every sprint;

performing profiling of the plurality of teams, the product backlog and the sprint duration (212);

performing a set of machine learning methods based on the profiling for generating a set of recommendations for matching the plurality of teams with the set of requirements for optimal release of the program (214), wherein generating the set of recommendations using the set of machine learning methods comprises comparing a planned story points with a total number of story points and performing following steps based on the comparison (310):

adding one or more requirements to the first set of requirements in a release backlog if the planned story points are less than the total number of story points (312); and modifying at least one of the following to enable a optimal release of the program in the agile delivery environment if the planned story points are more than the total number of story points (314):

reducing one or more requirements of the first set of requirements from the release backlog (316);

adding one or more teams to the list of teams who would participate in the release (318); and adding one or more sprints to the number of sprints required for the release if an end date of the program is not fixed (320);

delivering a minimum viable product corresponding to the program based on the set of recommendations at the end of every sprint (216); and managing the release of the program through an automated multiple deployment pipelines by defining various stages that the program would go through in a single click start (218).

\* \* \* \* \*